United States Patent
Parkert et al.

(10) Patent No.: US 6,568,493 B2
(45) Date of Patent: May 27, 2003

(54) SKID-STEER LOADER POWER SOURCE ATTACHMENT AND METHOD OF MANUFACTURE

(76) Inventors: Mark Joesph Parkert, 7705 Webster St., Omaha, NE (US) 68114; Anton James Bauermeister, 5810 Walnut St., Omaha, NE (US) 68106

(*) Notice: Subject to any disclaimer, the term of this patent is extended or adjusted under 35 U.S.C. 154(b) by 4 days.

(21) Appl. No.: 09/905,856

(22) Filed: Jul. 13, 2001

(65) Prior Publication Data

US 2002/0043409 A1 Apr. 18, 2002

(51) Int. Cl.[7] .............................................. B60K 25/00
(52) U.S. Cl. ........................ 180/53.1; 362/192; 60/911; 60/916
(58) Field of Search .................. 180/53.1, 53.4; 322/306, 1, 2, 9, 100; 318/564; 290/40, 4 A, 52; 362/459, 485, 486, 159, 192; 60/325, 269, 911, 419, 327, 310, 916

(56) References Cited

U.S. PATENT DOCUMENTS

| | | | | |
|---|---|---|---|---|
| 2,938,347 A | * | 5/1960 | Sturgis | 165/85 |
| 3,708,977 A | * | 1/1973 | Raymond | 60/453 |
| 4,218,886 A | * | 8/1980 | White | 60/486 |
| 4,220,981 A | * | 9/1980 | Koether | 362/238 |
| 4,323,329 A | * | 4/1982 | Chlad | 294/65.5 |
| 4,746,808 A | * | 5/1988 | Kaeser | 290/52 |
| 5,550,333 A | * | 8/1996 | Whiteman, Jr. | 181/204 |
| 5,806,963 A | * | 9/1998 | Miller et al. | 362/192 |
| 6,379,023 B1 | * | 4/2002 | Passno | 362/192 |
| 6,384,488 B1 | * | 5/2002 | Bucharelli et al. | 307/9.1 |

FOREIGN PATENT DOCUMENTS

| | | | | |
|---|---|---|---|---|
| GB | WO 82/03260 | * | 9/1982 | F21V/25/12 |

* cited by examiner

Primary Examiner—Lesley D. Morris
Assistant Examiner—Daniel Yeagley
(74) Attorney, Agent, or Firm—Dorothy S. Morse

(57) ABSTRACT

A power source attachment, and a method of manufacture, that runs only off the auxiliary hydraulics of a skid-steer loader or other prime mover. It can run lights and still have extra power to run one or more electrically operated tools on a construction or other jobsite, such as but not limited to welders, jackhammers, air compressors, saws, drills, grinders, and the like. The preferred embodiment comprises a frame, hydraulic hoses, an hydraulic motor, a generator with 110v and 220v plug-ins, and a hydraulic fluid flow control assembly. Optionally, the present invention can be adapted to hydraulically operate devices such as pumps and compressors simultaneously with the electrically powered tools. Since the present invention uses only the hydraulic power and engine horsepower of the prime mover to operate or be moved between locations, it does not require a diesel motor, ignition system, fuel tank, cooling system, or wheels.

20 Claims, 4 Drawing Sheets

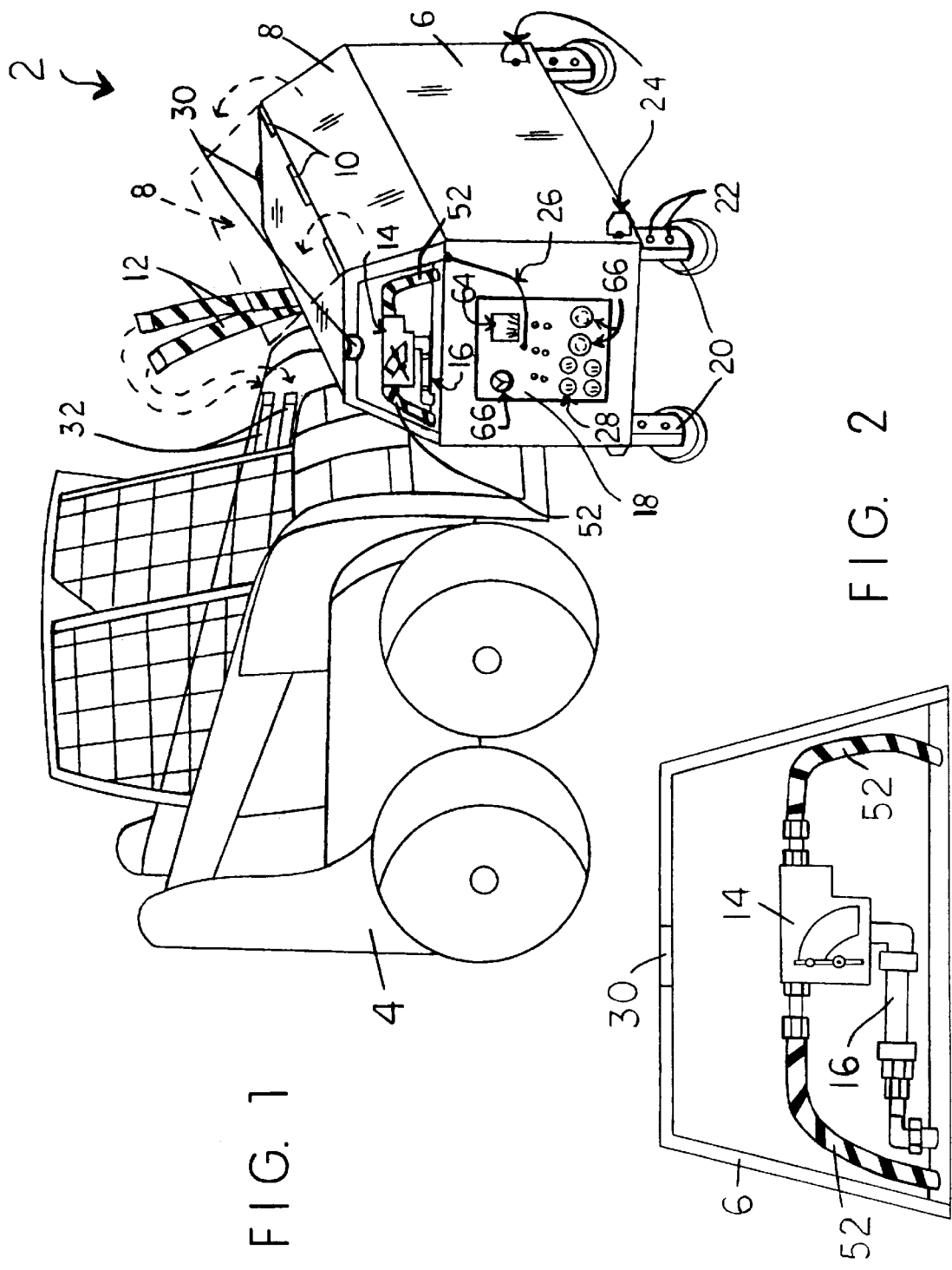

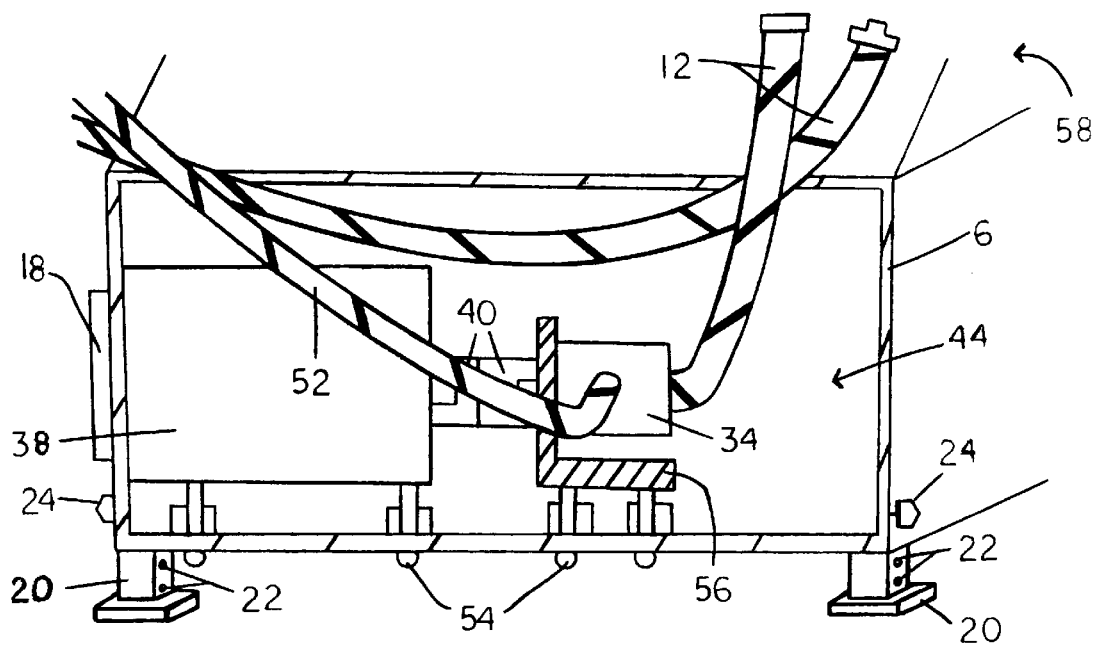
FIG. 5
FIG. 6
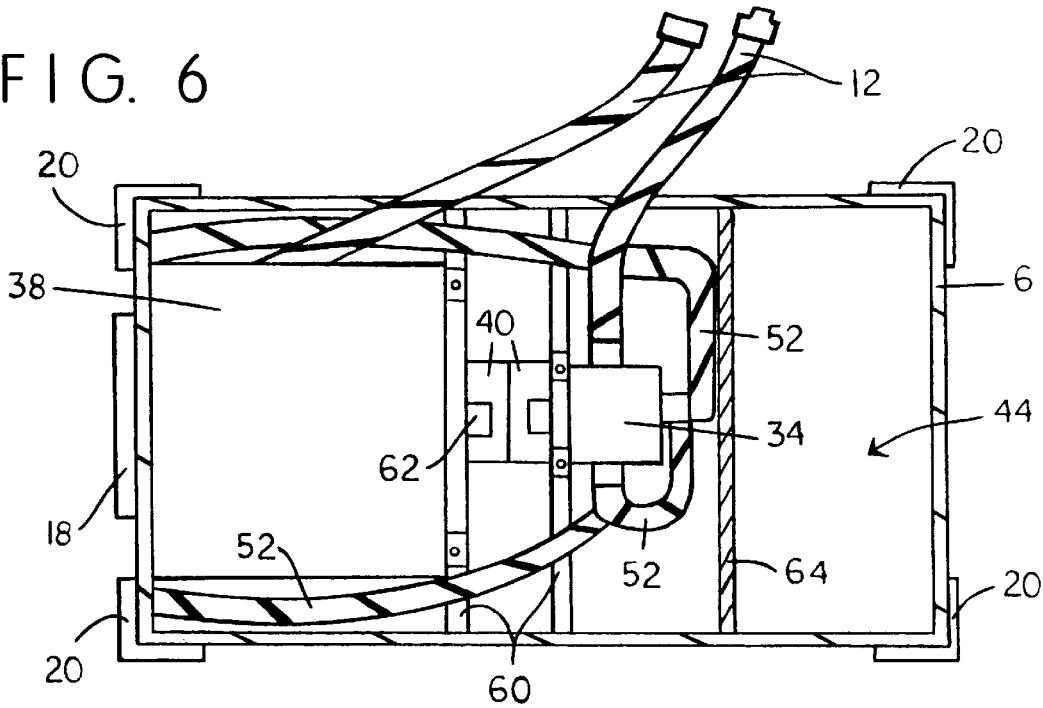

SKID-STEER LOADER POWER SOURCE ATTACHMENT AND METHOD OF MANUFACTURE

BACKGROUND

1. Field of Invention

This invention relates to the field of attachments for skid-steer loaders and other prime movers, specifically to a power source attachment, and a method for its manufacture, which runs only off of the auxiliary hydraulics of a skid-steer loader, excavator, or other prime mover. The present invention can operate lights that illuminate up to 2,500 square yards, or more, of a jobsite and still have extra power to run one or more other tools or pieces of equipment, such as but not limited to welders, electric jackhammers, air compressors, electric saws, electric drills, electric grinders, and the like. Due to the fact that the power source of the present invention uses the hydraulic power and engine horsepower of the skid-steer loader for operation and movement from one work area on a jobsite to another, or in the alternative that of other hydraulically operated pieces of equipment commonly found on jobsites, it does not need to include its own diesel motor, ignition system, fuel tank, cooling system, trailer wheels, undercarriage, or suspension. As a result the present invention is compact, easily usable in small and difficult to reach places, and is less inexpensive to own and operate than other means currently available for providing power to work areas on a jobsite where no municipal power is accessible, for the simultaneous operation of several electrical tools or pieces of power equipment, or the illumination of a work area and simultaneous operation of one or more electrical tools or pieces of power equipment.

2. Description of Prior Art

A wide variety of power tools and equipment are needed for use on construction and other jobsites to accomplish the tasks required in an efficient and timely manner. Often, municipal power is available, but does not conveniently extend at all work areas of the jobsite. Also, there may be small or particularly difficult-to-reach areas of a jobsite where a combination of lights and power equipment would be useful, and prior to the present invention there has been no efficient or convenient means by which to provide the needed power to such areas. Contractors typically purchase or rent portable generators to remotely operate some power tools and equipment. Yet when auxiliary lighting is also needed, larger gen-set combos are required which employ water-cooled diesel engines to operate several light sources mounted onto a telescoping tower. Typically, however, the gen-set combos provide only enough power to run the tower-mounted lights. Also, since they are heavy and large, the gen-set combos are often configured with a frame having wheels, as well as a tow bar, so that they can be pulled behind a motorized vehicle for movement between different work areas. Although convenient to use, the gen-set combos are expensive. Also, trucks may not be able to tow a gen-set combo into small or difficult-to-reach areas of a jobsite. In contrast, since it is moved by a prime mover already on the jobsite, such as a skid-steer loader, the present invention does not need its own wheels, suspension, diesel motor, ignition system, cooling system, or fuel tank, and can be used in small, hard to reach work areas. Also, since the present invention is smaller and has less components that a gen/set combo, it is less expensive to manufacture. The present invention is also more efficient to operate since its generator runs off of the fluid power of a skid-steer loader, excavator, and other prime movers already found on most jobsites. There are many attachments for skid-steer loaders, including demolition hammers, brooms, augers, backhoes, concrete pumps, pallet forks, chippers, graders, sod layers, snow blowers, stump grinders, and the like. However, none of these devices alone or in combination teach a power source attachment, nor an attachment with the same design specifications as the present invention. Further, there is no device is known that has all of the features and advantages of the present invention.

SUMMARY OF INVENTION—OBJECTS AND ADVANTAGES

The primary object of this invention is to provide a source of power for the operation of electric tools and power equipment that can be run only off of the auxiliary hydraulics of a skid-steer loader, excavator, or other prime mover already found on a jobsite. It is a further object of this invention to provide a power source attachment for skid-steer loaders and other prime movers that is smaller and more compact than trailer-mounted gen/set combos, has fewer components than a gen-set combo, is lower in cost than a gen-set combo so as to be more affordable to contractors, and meets the weights restrictions required for transport by a skid-steer loader or other prime mover intended for its transport from one job site location to another. It is also an object of this invention to provide a power source attachment for skid-steer loaders and other prime movers that can operate lights, for illumination of a work area on a jobsite, and still have extra power to run other electrical tools and pieces of power equipment. A further object of this invention is to provide a power source attachment for skid-steer loaders and other prime movers that have a design capable of being adjustable in height for added versatility and stability. It is a further object of this invention to provide a power source attachment for skid-steer loaders and other prime movers that is capable of simultaneously running several electrical tools or pieces of power equipment. A further object of this invention is to provide a power source attachment for skid-steer loaders and other prime movers that can easily be adapted for hydraulic operation of other devices, such as but not limited to air compressors, pumps, and welder/type generators. It is a further object of this invention to provide a power source attachment for skid steer loaders and other prime movers that can be used to power residences or small businesses during emergencies and other circumstances where municipal power is temporarily unavailable. It is also an object of this invention to provide an efficient power source in a compact self-contained unit that is convenient and easy to use. It is a further object of this invention to provide a power source attachment for skid-steer loaders and other prime movers that has an expandable design that can incorporate varying amounts of storage space for tools, equipment, unused hoses, and surplus extension cords. A further object of this invention is to provide a power source attachment for skid-steer loaders that can be attached to the front of the skid-steer loader for stability, as well as lifted by it and moved to other work areas on a jobsite, including small and difficult-to-reach places.

As described herein, properly manufactured and hydraulically connected to a skid-steer loader or other prime mover, the present invention would provide a power source that can operate lights and still have extra electric and hydraulic power to run other electrical tools and power equipment needed on a jobsite. It would be operated only from the auxiliary hydraulics of a skid-steer loader, excavator, or other prime mover commonly found on most jobsites. The preferred embodiment power source attachment would comprise a frame, hydraulic hoses with couplers configured for attachment to the auxiliary hydraulic connections of a skid steer loader, a generator with multiple power plug-ins, such as but not limited to varying combinations of 110-volt, 220-volt, and three phase, and having a minimum power generation capability to produce the amount of power required by the equipment needing operation in a designated work area, as well as an hydraulic motor to turn the generator. Preferably, the present invention would also have hydraulic flow control means to provide for steady operation, although the present invention is operational without it. The preferred embodiment of the power source attachment would further comprise adjustable ground support, such as adjustable jacks stands for height adjustment and stabilization of the frame during use, and a mounting plate attached centrally to the back of its frame for connection to the skid-steer loader or other prime mover to provide for additional stabilization of the attachment during use, as well as to provide the means by which the attachment can be lifted by the prime mover for easy transport from one work area on the jobsite to another. Optionally, the attachment frame can be used for the connection or support of other electrical devices, such as but not limited to telescoping light towers, pumps, and welder/type generators. Since the hydraulic motor of the present invention already spins a coupler to make the drive shaft of an attached generator turn, the present invention could be adapted to hydraulically power additional pieces of equipment needed on a jobsite, such as an air compress or water pump, through use of a belt and pulley connected off of the spinning coupler. This would provide the option for some pieces of power equipment to be either electrically or hydraulically operated by the present invention attachment, depending upon the individual jobsite needs. Since the present invention only uses the auxiliary hydraulics of a skid-steer loader or other prime mover and has fewer components than the trailer-mounted gen-set combos which can also illuminate a jobsite work area, the present invention is less expensive to manufacture and more affordable to contractors. Fewer components also means that the present invention is lighter in weight and thereby can meet the weight restriction required for lifting by the skid-steer loader or other prime mover intended for transport of the invention between different work areas on a job site. Since the present invention power source attachment uses the hydraulic power and engine horsepower of the skid-steer loader to move from one work area to another, its does not need its own diesel motor, ignition system, fuel tank, cooling system, undercarriage, trailer wheels, or suspension. Although not critical, the generator of the preferred embodiment would have a versatile selection of power plug-ins, to include but not be limited to 110-volt, 200-volt, and three phase, so that several electrical tools with different power requirements can be simultaneously run, such as but not limited to welders, electric jackhammers, air compressors, saws, drills, grinders, as well as any other tool contemplated for use at a jobsite. Further, the transfer of fluid power to electrical power provides an efficient power source and is easy to accomplish with the present invention. Convenience to an operator is also provided by one or more hinged doors attached to the upper part of the present invention frame, which allows the upper portion of the frame to be an easily accessed storage area for extra tools, equipment, unused hoses, and surplus extension cords. No power source attachment is known for skid-steer loaders or other prime movers, nor an assembly with all of the features and advantages of the present invention.

The description herein provides preferred embodiments of the present invention but should not be construed as limiting the scope of the power source attachment invention. For example, variations in the size and configuration of the frame; the size of generator used and the number and type of power plug-ins provided; the orientation and location of the generator, hoses, hydraulic motor, and fluid control devices within the frame; the means of attachment employed to secure the generator and hydraulic motor to the frame during transport and use; the amount of storage space existing within the frame; the means of ground support, stabilization, and height adjustment used for the frame; and the number of adjustable jack stands used when selected as one of the means for ground support or frame stabilization; other than those shown and described herein may be incorporated into the present invention as long as the total weight of the present invention does not exceed the maximum weight required for easy lifting by the skid-steer loader or other prime mover intended for transport between work areas on a job site. Thus, the scope of the present invention should be determined by the appended claims and their legal equivalents, rather than the examples given.

BRIEF DESCRIPTION OF THE DRAWINGS

FIG. 1 is a perspective view of a first preferred embodiment of the present invention positioned in front of a skid-steer loader with hydraulic hoses and couplers poised for attachment to the auxiliary hydraulic connections of the skid-steer loader, and broken lines and arrows showing a hinged door attached to the upper part of the frame that can be upwardly opened.

FIG. 2 is an enlarged front view of the hydraulic fluid control valve and flow meter in the first preferred embodiment that are connected outside of the frame, but in a recessed area within one side of the upper portion of the frame, so that they remain protected from inadvertent jobsite contact while being readily accessible for observation and adjustment during power generation use.

FIG. 5 is a sectional side view of the lower portion of the frame in the first preferred embodiment with the generator and hydraulic motor secured to the frame, the face plate of the generator exposed through the side of the frame, the hydraulic motor attached to an L-shaped support bracket, the drive shaft of the generator and the hydraulic motor connected to one another by a coupler, and hoses connected to the hydraulic motor that permit flow of hydraulic fluid through the hydraulic motor for power generation, with an arrow indicating the presence of an upper storage area within the upper portion of the frame.

FIG. 6 is a top view of the first embodiment of the present invention having a generator and an hydraulic motor connected by a coupler, support bars within the frame adjacent to the generator and the hydraulic motor, the face plate of the generator exposed through the side of the frame, and hoses connected to the hydraulic motor that permit flow of hydraulic fluid through the motor.

DETAILED DESCRIPTION OF PREFERRED EMBODIMENTS

Figure 3:
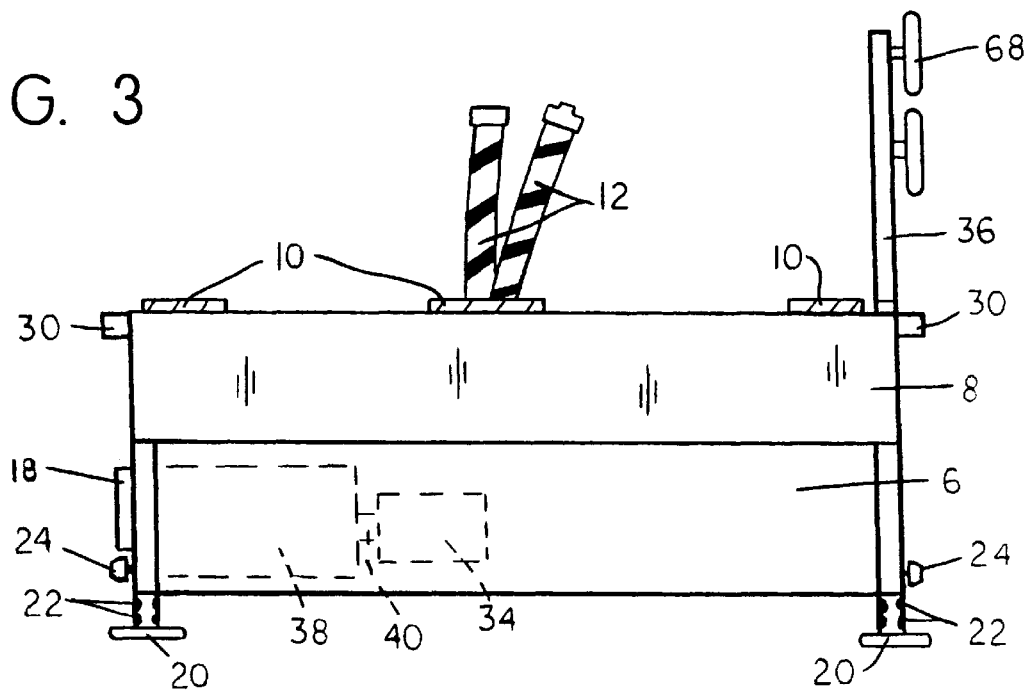
FIG. 3 is a front view of a second preferred embodiment of the present invention having a hinged door attached to the upper part of its frame, the door being in a closed position, hydraulic hoses and couplers extending upwardly behind the frame, broken lines showing a generator and hydraulic motor connected to one another within the frame by a coupler, optional multiple-use brackets attached to the top of the frame at opposite ends thereof, adjustable jack stands supporting the lower corners of the frame, and a light tower connected to the top of the frame.
Figure 4:
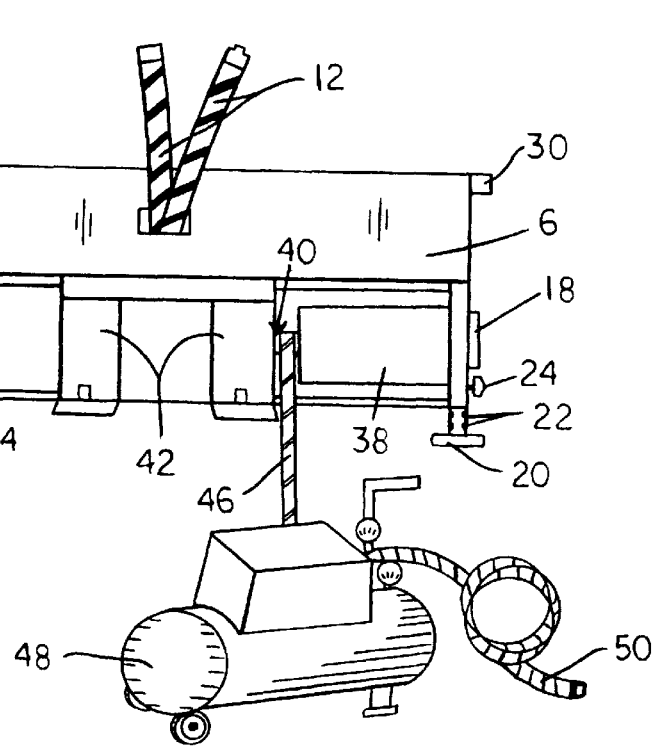
FIG. 4 is a rear view of a third embodiment having hydraulic hoses and couplers extending upwardly beyond the back of the frame, a generator and coupler housed within the frame, optional multiple-use brackets attached to the top of the frame at opposite ends thereof, a collapsed telescoping light tower supported by one of the brackets, adjustable jack stands supporting the lower corners of the frame, a mounting plate centrally connected to the back of the frame and configured for secure connection to a skid-steer loader as well as lifting of the frame by the skid-steer loader, and a lower storage area within the frame that is accessible through openings in the back of the frame, in addition to an air compressor attached by a belt to a pulley to the coupler so as to run off of the hydraulic power causing the coupler to spin.

FIG. 1 shows a first preferred embodiment of the present invention 2 having a frame 6, with a door 8 attached to the front side of its upper portion through the use of three hinges 10, with the lower corners of frame 6 each being supported by a jack stand 20. Although not visible in FIG. 1, the hidden fourth lower corner of frame 6 would also be supported by a jack stand 20. The number of jack stands 20 used is not critical, and it is contemplated to be within the scope of present invention 2 to have more than four jack stands 20, as well as other adjustable ground support means for frame 6 in place of one or more of the jack stands 20 shown in FIG. 1. Further, although FIG. 1 shows the bottom portion of jack stands 20 having an arcuate shape, other geometric configurations are also considered to be within the scope of the present invention, such as but not limited to hexagonal, octagonal, and the rectangular configuration shown in FIG. 4. FIG. 1 also shows present invention 2 positioned in front of a skid-steer loader 4 with two hydraulic hoses and couplers 12 extending above door 8 from the back side of frame 6. It is contemplated during use of present invention 2 for hydraulic hoses and couplers 12 to be connected to the two auxiliary hydraulic connections 32 attached to the front of skid-steer loader 4, as indicated by the broken arrows from hydraulic hoses and couplers 12 to auxiliary hydraulic connections 32. One hydraulic hose and coupler 12 is used to divert hydraulic fluid (not shown) from skid-steer loader 4 to present invention 2 for use in generating power for the operation of power tools and/or lights, such as light sources 68 shown in FIGS. 2 and 3 attached to light tower 36. The other hose and coupler 12 is used to return the hydraulic fluid back to skid-steer loader 4, or the other prime mover from which it had been diverted. Although not illustrated in FIGS. 1–7, it is also contemplated for present invention 2 to be used with an excavator, and any other type of prime mover commonly used on jobsites, that incorporate or can be adapted to incorporate auxiliary hydraulic connections 32 into their design. The frame 6 of present invention 2 is shown as having a rectangular lower portion, and a contiguous upper portion having the cross-sectional configuration of a trapezoid. While the rectangular and trapezoidal configurations are not critical, and other configurations could be used such as a square lower portion in smaller embodiments of frame 6 and curved surfaces on the upper portions in selected embodiments of frame 6, the elongated rectangular and trapezoidal configurations are preferred so that the lower portion of frame 6 can offer a flat surface for connection to the front of skid-steer loader 4 during use, allow some storage space within frame 6 for miscellaneous items, and the upper portion of frame 6 can taper away from skid-steer loader 4 to permit adequate room for the connection of hydraulic hoses and couplers 12 to the auxiliary hydraulic connections 32 of skid-steer loader 4. Although not shown in FIG. 1, it is contemplated for the lower portion of frame 6 to house the generator 38 (shown in FIGS. 2–5) that is attached to the end panel 18 extending through the visible side of frame 6, in addition to housing coupler 40 and hydraulic motor 34 (also not shown in FIG. 1, but shown in FIGS. 2, 4, and 5). It is also contemplated for the upper portion of frame 6 to be used for mounting of the hydraulic fluid control valve 14 and flow meter 16 in positions where an operator (not shown) would have easy access thereto, as well as for the storage of unused objects (not shown) such as tools, equipment, hoses, extension cords, and the like. Depending upon the size of frame 6, its lower portion can also provide storage space for tools, equipment, hoses, extension cords, and other items found at the work area in and around frame 6. Factors in determining the minimum size of frame 6 are the size of generator 38 used for power generation, as well as the perceived importance of having the end panel 18 of generator 38 conveniently visible while adjustments are made to flow control valve 14. If such convenience and upper storage space are not needed, the upper portion of frame 6 can be minimized and both flow control valve 14 and flow meter 16 can be located elsewhere on frame 6 other than in the positions shown in FIG. 1, such as on the back upper portion of frame 6, or the front upper portion of frame 6, on or adjacent to door 8, although placement on door 8 would be the least preferred. The most critical factor in determining the maximum size of frame 6 is the maximum carrying weight of the smallest prime mover to which it is intended for connection, such as skid-steer loader 4. Although not seen in FIG. 1, but shown in FIGS. 3 and 4, present invention 2 has a mounting plate 42 that can be used by skid-steer loader 4 to lift present invention 2 and move it between usable locations. Mounting plate 42 is also useful for securing present invention 2 to skid-steer loader 4 for extra stabilization during use, particularly desirable when present invention 2 is used on uneven terrain, or when light tower 36 is positioned on the same side of frame 6 where generator 38 is housed. FIG. 1 shows jack stands 20 as being adjustable in height through use of apertures 22 and hitch pins 24. The use of hitch pins 24 is not critical, and any bolt or pin that can securely fix jack stand at a designated height may be used. Also, the use of jack stands 20 is not critical, and although not shown it is also considered to be within the scope of present invention 2 for frame 6 to have other known means of adjustable ground support, as long as the type of ground support used does not interfere with the lifting of frame 6 by skid-steer loader 4 or any other type of prime mover (not shown) commonly found on jobsites.

In addition, the number, size, and configuration of doors 8 used, are not critical, nor are the number, size, and configuration of hinges 10 connecting door doors 8 to the upper portion of frame 6. In the alternative to the single large door 8 shown in FIG. 1, two or more smaller doors 8 could be secured against the upper front portion of frame 6, each attached by one or more hinges 10, and attached so as to open in any direction, up, down, or from either its left or right side. Further, if access to storage space 58 (shown in FIG. 5) in the upper portion of frame 6 is not critical or needed, door 8 can be omitted. Also, one or more of the doors 8 used could optionally be locked by any conventionally known means, particularly if partitions similar to partition 64 in FIG. 6 were placed within storage space 58 to divide it into two or more independently accessed compartments. Although upward opening of door 8 in the first preferred embodiment is not critical, broken lines show the preferred upward direction for opening door 8, so that easy access can be gained to the interior of frame 6. Further, although not shown in FIG. 1, hinges 10 would be configured to allow door 8 to be opened flat against the top of frame 6 so that the operator's assistance is not continuously required to maintain door 8 is an opened position for an extended period of time. Since storage space 58 behind door 8 is not shown in FIG. 1, the manner of supporting stored items therein is not revealed. However, use of a rigid grate that is made from steel or other rugged material, and secured in a horizontally extending position between the upper and lower portions of frame 6, would be preferred. A solid panel or combination of structures could also be used, but in any instance, weight considerations would have to be evaluated to insure that the present invention 2 remains within the maximum weight lifting capability of the prime mover intended for its jobsite transportation.

FIG. 1 also shows frame 6 having two multiple-use brackets 30, one centrally mounted on each end in an opposed position from the other, and both being positioned near to the top of frame 6. As can been seen in FIG. 3, one contemplated use for brackets 30 is the mounting of structures used to support light sources 68, such as the light tower 36. Among the various other uses possible for brackets 30, they could be used to direct electrical cords from light tower 36 toward end panel 18, when light tower 36 is connected to the bracket 30 remote from end panel 18, and maintain such cords in a position that prevents interference with use of door 8. FIG. 1 further shows the end panel 18 of a generator 38 housed within frame 6 (generator 38 is shown in FIGS. 2–5) extending through the side of frame 6 and having a volt meter 64, several 110-volt electrical plug-ins 28, and several 220-volt electrical plug-ins 66 for use in the connection of power tools and equipment (not shown) during power generation created by flow of hydraulic fluid (not shown) through hydraulic motor 34. As previously mentioned, three phase power plug-ins can also be provided for additional versatility on the jobsite. In addition, FIG. 1 shows a ground wire 26 being connected between end panel 18 and frame 6. FIG. 1 also shows hydraulic hoses 52 connected to a flow control valve 14, with both hoses 52 and fluid control valve 14 being positioned outside of frame 6 for easy access by an operator (not shown) and protected in a shallow recessed area within the trapezoidal upper portion of frame 6 used for shielding them from inadvertent jobsite contact. FIG. 1 further shows a flow meter 16 hydraulically connected to flow control valve 14, and also positioned outside frame 6 and protected within the same shallow recess in the trapezoidal upper portion thereof. Although not shown in FIG. 1, in the first preferred embodiment of present invention 2 it is contemplated for the side of frame 6 opposed to end panel 18 to be planar, unadorned, and have no shallow recess in its trapezoidal upper portion. However, its configuration is not critical, and the configuration of the opposing side of frame 6 can be adapted for any useful purpose contemplated, as long as it would not interfere with the lifting of frame 6 by skid-steer loader or other prime mover (not shown).

Although not limited thereto, in the first preferred embodiment of the present invention 2 frame 6 would be made from a rugged and weather-resistant materials, such as steel, and have respective width and length dimensions of approximately thirty inches and sixty inches. The height dimension of frame 6 would be determined by the size of generator 38, as well as the front configuration of skid-steer loader 4 or other prime mover (not shown) contemplated for transport between jobsite work areas. Also, present invention 2 would be limited in weight so as to be within the maximum weight lifting capability of the intended prime mover or skid-steer loader 4 relied upon for jobsite transportation. The first preferred embodiment shown in FIG. 1 would have a maximum weight of approximately seven hundred and fifty pounds. The present invention could easily provide power having a voltage of approximately 250-volts. Further, the present invention could be manufactured or adapted to divert the maximum hydraulic fluid flow available through the auxiliary connections 32 of skid-steer loader 4 or other prime mover (not shown), whether the hydraulic fluid flow is 16 gpm, 20 gpm, 39 gpm, or more. Further, when a ten thousand watt generator 38 is used as the primary piece of equipment hydraulically powered by present invention 2, and when two thousand to four thousand watts are diverted for the operation of lights, such as light sources 68 mounted on the light tower 36 shown in FIGS. 2 and 3, an ample amount of electrical power would remain available for use in operating one or more power tools and pieces of equipment needed on a jobsite, such as but not limited to welders, grinders, saws, and sanders (not shown) in addition to air compressors, such as air compressor 48 shown in FIG. 3. Also, although not shown in FIG. 1 but represented in FIG. 7, it is contemplated for present invention 2 to have a relief valve or check valve as a safety by-pass, should the flow of hydraulic fluid from skid-steer loader 4 be unexpectedly interrupted. In the first preferred embodiment of present invention 2, although not limited thereto, the safety by-pass would be designed or adjusted for operation when hydraulic fluid pressure exceeded the standard maximum system pressure anticipated at auxiliary hydraulic connections 32 FIG. 2 shows the visible portion of the hydraulic fluid control assembly in the first preferred embodiment of present invention 2, that is connected outside of frame 6 and within a protective recess in the upper portion of frame 6 that shields fluid control valve 14 and flow meter 16 from inadvertent jobsite contact, but at the same time allows them to remain readily accessible for observation and adjustment during use. As can be seen in FIG. 1, it is preferred for fluid control valve 14 and flow meter 16 to be located on the same wall of frame 6 where the end panel 18 of generator 38 is positioned, so that an operator (not shown) can easily view voltmeter 64 to see whether there is any change in voltage output from generator 38 as adjustment is made to fluid control valve 14. FIG. 2 also shows hoses 52 which connect fluid control valve 14 to hydraulic motor 34 and move the hydraulic fluid (not shown) diverted from skid-steer loader 4 within present invention 2. Hoses 52 are also positioned at least in part within the trapezoidal recess providing protection to fluid control valve 14 and flow meter 16. Although the connection of hoses 52 is shown in FIG. 2 through the bottom surface of the recess, it is contemplated for hoses 52 to be connected through frame 6 wherever it is most convenient and cost effective to do so. FIG. 2 further shows one optional multiple-use bracket 30 connected to frame 6 above the recess protecting fluid control valve 1 and flow meter 16.

FIG. 3 shows a second preferred embodiment of present invention 2 having a door 8 attached to the upper part of its frame 6 with hinges 10, and further having hydraulic hoses and couplers 12 extending upwardly behind frame 6 for attachment to the auxiliary hydraulic connections 32 of a prime mover, such as skid-steer loader 4. Although three small hinges 10 are shown in FIGS. 1 and 3 connecting door 8 to frame 6, other number, sizes, configurations, and types of fasteners for connecting door 8 to frame 6 are also considered to be within the scope of the present invention, including the use of a single piano-type hinge extending substantially the full length of frame 6 (not shown). Also, when convenient for any intended purpose, more than one door 8 can be attached to frame 6 instead of the single door 8 shown in FIG. 3, with one or more doors 8 having a lock (not shown). Although multiple-use brackets 30 are present in FIG. 3, connected to opposing ends of the upper portion of frame 6, brackets 30 are considered optional components, and may comprise structures permanently fixed to frame 6, or structures that are at least removable in part therefrom. Further, in FIG. 3 light tower 36 is directly connected to the top of frame 6, not supported by one of the multiple-use brackets 30. Although not shown, light tower 36 could be temporarily secured within an opening through the top surface of frame 6 during use, or welded for permanent mounting to the top surface of frame 6. However, the placement of any light tower 36 against frame 6 should take into consideration the size of door or doors 8 and how far doors 8 will extend as they are opened upward and folded back over the top of frame 6. Although not evident in FIG. 3, light tower 36 could either have a fixed length, or be telescoping in nature. In comparing FIG. 3 to FIG. 4, one can see that if a telescoping type of light tower 36 was represented in both, FIG. 3 would represent light tower 36 in an extended or partially extended configuration, while FIG. 4 would represent the same light tower 36 in its fully retracted configuration. Further, the number, size, configuration, and type of the light sources 68 attached to light tower 36 is not critical. Although two similarly configured light sources 68 are shown in FIG. 3, it is considered within the scope of present invention 2 to have more or less than two light sources 68, connected to light tower 36. Behind the lower part of frame 6, broken lines in FIG. 3 show the general positioning of generator 38 and hydraulic motor 34 within frame 6, and each being connected to the other by a coupler 40. The end panel 18 of generator 38 is shown extending beyond the side of frame 6 so that an operator (not shown) can have ready access to voltmeter 64, as well as 110-volt electrical plug-ins 28 and 220-volt electrical plug-ins 66. Hoses, shown in FIGS. 1, 4, and 5 by the number 52, which connect hydraulic motor 34 to flow control valve 14 and flow meter 16, are not illustrated in FIG. 3. In addition, FIG. 3 shows the lower corners of frame 6 each supported by an adjustable jack stand 20. Although each jack stand 20 is independently operable from the others, in combination all jack stands 20 can be used to raise and lower frame 6 in its entirety, or one or more jack stands 20 can be raised or lowered at a time with respect to the others to accommodate for uneven terrain (not shown). The number of jack stands 20 attached to frame 6 is not critical, and use of more than four jack stands 20 to support frame 6 is considered to also be within the scope of present invention 2. FIG. 3 further shows the apertures 22 and hitch pins 24 contemplated for use in present invention 2 to raise and lower jack stands 20. However, its is not contemplated for the means of ground support for frame 6 to be limited to jack stands 20, apertures 22, and hitch pins 24, and consequently any other known means of adjustable support for frame 6 is also considered within the scope of the second preferred embodiment of present invention 2.

FIG. 4 shows a third preferred embodiment of present invention 2 having two hydraulic hoses and couplers 12 extending upwardly beyond the upper back portion of frame 6. As can be seen in FIG. 4, no door 8 is connected to the upper back portion of frame 6, although one or more small doors 8 could be connected thereto if firmly secured to frame 6 by fasteners (not shown) or a lock, and if further positioned so that no door 8 would interfere with the lifting of present invention 2 by skid-steer loader 4. FIG. 4 also shows generator 38 and coupler 40 housed within the lower portion of frame 6, with the end panel 18 of generator 38 exposed through the wall in the adjacent side of frame 6. Although not shown in FIG. 4, but shown in FIG. 5, generator 38 is secured to the bottom of frame 6 so that it will remain in a stationary position relative to frame 6 during use, as well as during transport of present invention 2 to different work areas within a jobsite by skid-steer loader 4 or any other prime mover (not shown). FIG. 4 shows the back of frame 6 open for easy access to generator 38 and coupler 40, as well as open on the end of frame 6 remote to end panel 18, to provide easy access to a lower storage area 44. Although not preferred but considered within the scope of present invention 2, it is contemplated for smaller frames 6 to be closed across their lower back portions, with access to generator 38, coupler 40, and hydraulic motor 34 through the upper portion of frame 6, the side of frame 6 remote from end panel 18, or through doors 8 attached with hinges 10 across the back lower portions of frame 6. It is preferred for the back of frame 6 to be substantially open, as a weight reducing factor for easier and more cost effective transport by skid-steer loader 4, as well as for more prompt and convenient access to generator 38, coupler 40, and hydraulic motor 34. FIG. 4 also shows one multiple-use bracket 30 attached to the top of the upper portion of frame 6 at opposite ends thereof, and light tower 36 connected to frame 6 through one bracket 30. Light tower 36 could be attached to either bracket 30, however, when telescoping and attached to the bracket 30 on the same side of frame 6 where generator 38 is housed, for enhanced balance and stability of present invention 2, it is contemplated for frame 6 to be securely connected to skid-steer loader 4 through use of mounting plate 42. Although FIG. 4 shows two light sources 68 attached to light tower 36, the use of two light sources 68 is not critical, and light sources 68 may also consist of any type, configuration, or arrangement of lights convenient to the intended use, as long as their power requirements do not exceed the power generation capability of present invention 2. In FIG. 4, light tower 36 can have a fixed length, or a telescoping construction so that it can be raised and lowered to position light sources 68 at varying heights. Should light tower 36 incorporate a telescoping function, and after comparing the length of the light tower 36 in FIG. 3 to that shown in FIG. 4, it can be seen that the light tower 36 in FIG. 3 is in a substantially collapsed or retracted configuration. Although not shown, it is considered within the scope of the present invention for a telescoping light tower 36 to have an even greater extended length dimension than is shown in FIG. 4. FIG. 4 also shows the lower corners of frame 6 being supported by jack stands 20, which are each independently adjustable from the others through the use of a plurality of uniformly spaced-apart apertures 22 and an easily removable hitch pin 24 that can be firmly secured in place during use and protected against inadvertent removal. FIG. 4 further shows a mounting plate 42 centrally connected to the lower back portion of frame 6 and configured so that mounting plate 42 can be employed by present invention 2 for secure connection to skid-steer loader 4 during power generation, as well as for stable and secure lifting of frame 6 by skid-steer loader 4 into a raised position during transport of present invention 2 from one jobsite work area to another. FIG. 4 also shows an adaptation of the third preferred embodiment of present invention 2 for hydraulic operation of an air compressor 48 with attached air hose 50. Thus, depending upon the power generation demands placed upon present invention 2 at a jobsite, operators of present invention 2 would have the option of hydraulic operation for air compressor 48, or the alternative choice of providing power for air compressor 48 through the appropriate 110-volt electrical plug-ins 28 or 220-volt electrical plug-ins 66 in end panel 18. In FIG. 4, air compressor 48 is shown connected to present invention 2 through spinning coupler 40, which is attached for rotation between generator 38 and hydraulic motor 34. A pulley (not shown in FIG. 4) would be connected to coupler 40, with a belt 46 connected between the pulley and air compressor 48 so that air compressor 48 will operate only as a result of the rotation of coupler 40, with coupler 40 rotating in response to the hydraulic fluid (not shown) flowing through hydraulic motor 34, and not as a result of any electrical connection to 110-volt plug-ins 28 or 220-volt plug-ins 66 in end panel 18. Although not shown in FIG. 4, it is also considered to be within the scope of present invention 2 for other types of equipment, such as a water pump (not shown), to be hydraulically operated from coupler 40 via belt 46, in place of, or in addition to air compressor 48. Thus, although use of an hydraulic motor 34 is preferred as it is more dirt tolerant and can run maintenance-free for an extended period of time, it is contemplated by the present invention to also have equipment hydraulically powered inside or outside of frame 6 only by its connection to hydraulic fluid carrying hoses, such as hydraulic hoses 12, or hydraulically powered through the use of varying combinations of belts and pulleys, chains and sprockets, or drive shafts, gears, and transmissions. Further, any equipment having a size dimension less than that of lower storage area 44 could be housed therein during hydraulic operation.

FIG. 5 shows the lower portion of frame 6 in the first preferred embodiment of present invention 2 supported on jack stands 20 that are adjustable through use of apertures 22 and hitch pins 24. FIG. 5 also shows a partially illustrated upper portion of frame 6, with the number 58 connected to an arrow indicating the space within the upper portion of frame 6 that is usable as a storage area for a variety of tools, equipment, unused hoses, surplus extension cords (not shown), and the like. In the lower portion of frame 6, FIG. 5 shows generator 38 connected to hydraulic motor 34 through use of a coupler 40. One hydraulic hose and coupler 12 is connected to hydraulic motor 34, and functions to return hydraulic fluid (not shown) to the prime mover from which it was originally diverted, such as skid-steer loader 4. The other hydraulic hose and coupler 12 brings the diverted hydraulic fluid into present invention 2 where it travels through flow control valve 14, and subsequently through one or more hoses 52 to hydraulic motor 34. FIG. 5 also shows hydraulic motor 34 being supported by an L-shaped bracket 56 so that its drive shaft can be aligned with coupler 40 and the drive shaft of generator 38, shown in FIG. 7 by the number 62. The use of L-shaped bracket 56 is not critical, and other mounting brackets (not shown) having different configurations could also be used as long as they are sturdy in construction with minimal mass to help maintain the overall weight of present invention 2 comfortably below the maximum lifting capacity of skid-steer loader 4 or the other prime mover intended for transport of the present invention. FIG. 5 also shows generator 38 and L-shaped bracket 56 being attached to the bottom inside surface of frame 6 with fasteners 54, such as bolts. The number of fasteners 54, used to attach generator 38 and L-shaped bracket 56 to frame 6, may vary as long as generator 38 is maintained close to one side of frame 6 where the end panel 18 of generator 38 can be exposed through frame 6 for easy operator viewing, and both generator 38 and L-shaped bracket 56 remain immobile during operation. The arrow and attached number 44 generally show an area within the lower portion of frame 6 that can be used for additional storage of tools, equipment, unused hoses, surplus extension cords (not shown), and other items found in and around frame 6.

Similarly, FIG. 6 shows the lower portion of frame 6 in the first preferred embodiment of present invention 2 supported on jack stands 20. Although not shown, it is considered to be within the scope of present invention 2 for other sturdy and adjustable support members to be substituted for jack stands 20. FIG. 6 also shows generator 38 positioned adjacent to one side of frame 6 with the end panel 18 of generator 38 exposed through frame 6 so that it can be easily accessed by an operator (not shown) during power generation use. FIG. 6 further shows a coupler 40 that is connected between the drive shafts of generator 38 and hydraulic motor 34. Optional metal bars 60, attached on their opposing ends to opposite walls of frame 6, can be used to further secure generator 38 and hydraulic motor 34 in fixed positions within frame 6. FIG. 6 also shows a partition 64 that can be permanently installed within frame 6, or temporarily used to separate lower storage area 44 from the space within frame 6 housing generator 38 and hydraulic motor 34. FIG. 6 shows two hydraulic hoses and couplers 12, and several other hoses 52, all being used in combination to divert hydraulic fluid (not shown) from the prime mover to which present invention 2 is connected, such as skid-steer loader 4, and cause the diverted hydraulic fluid to move through hydraulic motor 34, and subsequently return to the same prime mover. As the hydraulic fluid moves through hydraulic motor 34, the coupler 40 attached to hydraulic motor 34 is made to spin, which then turns the drive shaft 62 of generator 38 for electrical power generation. Access to the generated electrical power is available through multiple 110-volt plug-ins 28 and multiple 220-volt plug-ins 66 in end panel 18. In the alternative, although not shown in FIG. 6, additional equipment, such as air compressor 48 or a water pump, could be hydraulically operated from a direct connection to spinning coupler 40 through use of a pulley and belt 46.

Figure 7:
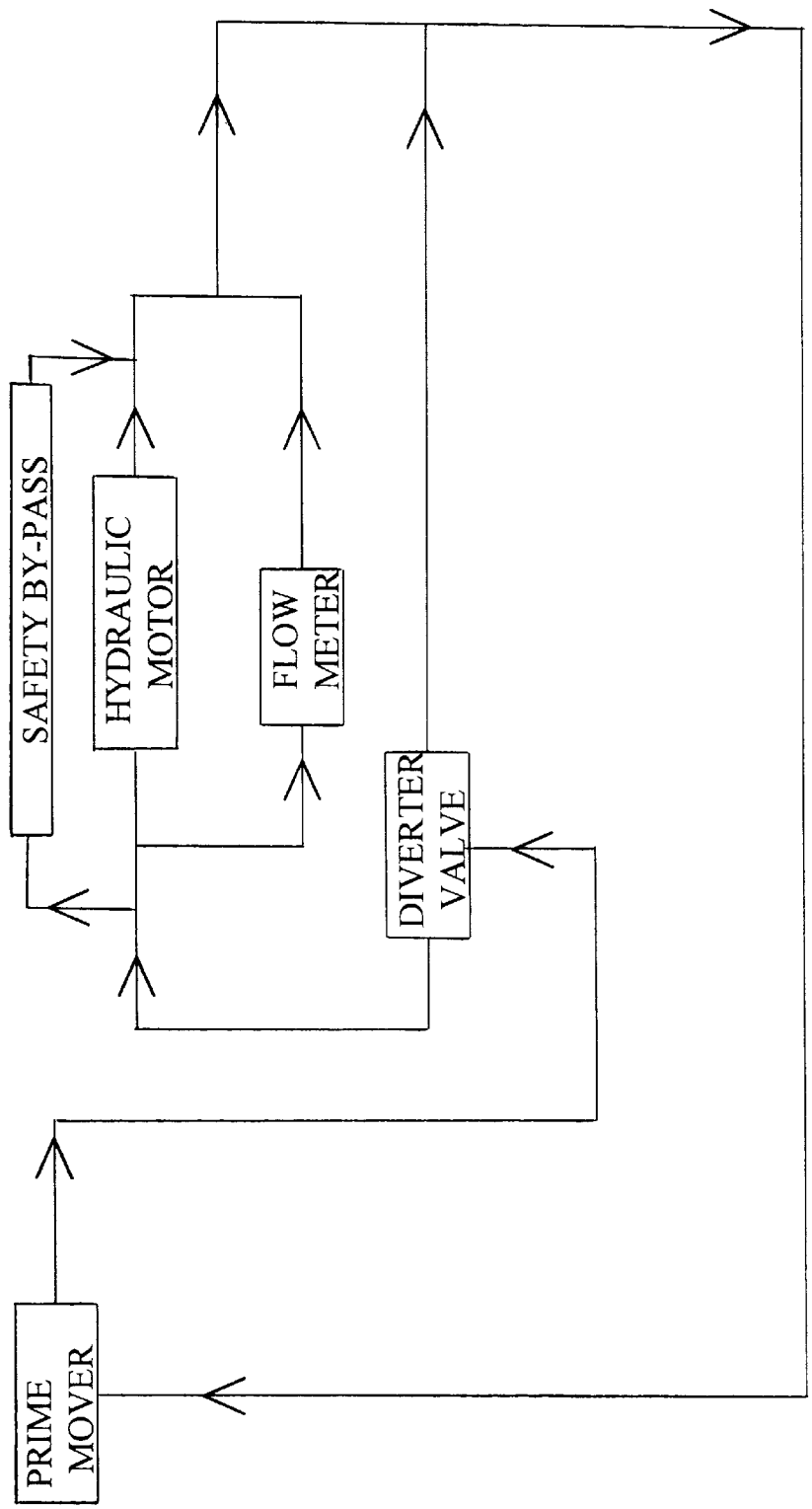
FIG. 7 is a schematic diagram of the flow of hydraulic fluid between a prime mover and the present invention, as well as its flow within the present invention.

FIG. 7 shows a schematic representation of the flow of hydraulic fluid from a prime mover, such as skid-steer loader 4, through present invention 2, and return of the hydraulic fluid to the same prime mover. FIG. 7 shows the hydraulic fluid first being transported to a diverter valve, such as fluid control valve 14. Depending upon the amount of power generation needed to operate electrical tools and power equipment on a jobsite, fluid control valve 14 can be partially opened whereby some of the diverted hydraulic fluid will be returned to the prime mover without having traveled through hydraulic motor 34. In the alternative, fluid control valve 14 can gradually opened so that all or substantially all of the diverted hydraulic fluid will be allowed to flow toward hydraulic motor 34. Gradual opening of fluid control valve 14 allows for smooth operation of present invention 2 and less strain on its components. As can be seen from FIG. 7, a portion of the hydraulic fluid moving toward hydraulic motor 34 will be directed through flow meter 16, which in FIGS. 1 and 2 can be seen mounted to the outside of frame 6, where it can be easily viewed by an operator (not shown). Once the hydraulic fluid leaves hydraulic motor 34, it is combined with the hydraulic fluid traveling through flow meter 16, as well as the hydraulic fluid flowing only through fluid control valve 14, whereby after combination the originally diverted hydraulic fluid is returned to the prime mover. Although operational without it, as shown in FIG. 7, it is preferred for present invention 2 to have a safety bypass in the form of a relief valve or check valve, to relieve pressure should hydraulic flow from the prime mover be suddenly interrupted. Although the use of fluid control valve 14 and flow meter 16 is not critical, their use is preferred to reduce the full impact of instantaneous on and off hydraulic fluid flow that might otherwise be hard on the components of present invention 2.

As a result, present invention 2 can be taken into small or difficult to reach work areas by a prime mover, such as skid-steer loader 4, and used to operate a variety of power tools and equipment needed on a jobsite, such as but not limited to welders, saws, grinders, air compressors, pumps, jack hammers, drills, and the like. Large gen/set combos generally need to be towed by a motorized vehicle, and would not have access to as many small or difficult to reach work areas as present invention 2. Also the large gen/set combos are more expensive for contractors to rent or purchase than present invention 2, since the large gen/set combos require a diesel motor, fuel tank, ignition system, wheels, undercarriage, and suspension for transport from one work area to another, instead of relying on those of a prime mover already available on the jobsite. Although not required but preferred, mounting plate 42 can be employed to connect frame 6 to the front of skid-steer loader 4 at any time, and on any type of ground surface, for the stabilization of present invention 2 during use. Present invention 2 would also have adjustable jack stands 20, or other type of adjustable legs, feet, or support members, for additional stabilization of frame 6 upon uneven terrain. Although present invention 2 could vary in size and power generation capability, its maximum weight would be determined by the maximum lifting capacity of the smallest prime mover intended for its transport. The size of frame 6, including its height, would be determined at least in part by the size of generator 38 used and whether tool and equipment storage space 58 or 44 was desired. However, for illustrative purposes it has been found that a practical and useful size of frame 6 would comprise length and width dimensions of approximately sixty inches and thirty inches, respectively. Such dimensions would allow both upper storage area 58 and lower storage area 44. If lights are part of a jobsite requirement, it is contemplated for present invention 2 to provide lighting for up to or even more than, approximately 2,500 square yards of work area, and also to have surplus power available that is sufficient to operate at least one other power tool, including a welder that can potentially draw a lot of amperage. For versatility in satisfying lighting requirements, a telescoping light tower 36 could be used. Optionally, although not shown, a welder/type generator could be housed within frame 6 in place of generator 38, and be hydraulically operated by hydraulic motor 34. Also, additional equipment, such as air compressor 48 or a water pump (not shown), instead of being electrically powered through use of the 110-volt plug-ins 28 or 220-volt plug-ins 66 in the end panel 18, could be hydraulically operated through use of a pulley and belt 46 attached to the existing coupler 40 already spinning as a result of the hydraulic fluid diverted from skid-steer loader 4 through hydraulic motor 34, or powered directly by the hydraulic fluid flow diverted from skid steer loader 4 or other prime mover without the use of hydraulic motor 34. The hydraulic operation of additional equipment concurrently with, or in place of, the primary piece of power equipment with a drive shaft directly connected to coupler 40, would increase the adaptability of present invention 2 to various work requirements, and thereby enhance its value to contractors. Another option considered within the scope of present invention 2, would be for hydraulic connection of air compressor 48 or a water pump (not shown), in place of generator 38, directly to coupler 40, as the primary piece of power equipment hydraulically operated by present invention 2. The conversion of fluid power to electrical power by present invention 2 is efficient, desirable, and unique, and allows all of the power tools and equipment powered thereby to be conveniently operated in front of the prime mover from which the hydraulic fluid is diverted. Further, although present invention 2 could operate without flow control valve 14 and flow meter 16, some sort of hydraulic fluid control assembly is preferred to prevent the repeated sudden and forceful flow of hydraulic fluid into present invention 2 that would otherwise be hard on components.

To construct present invention 2, one would first determine the power generation capability required at a jobsite and the size of generator 38 needed to satisfy the requirement. A frame 6 of rugged weather-resistant material, such as steel or a combination of steel and other materials, would then be constructed to enclose generator 38, as well as coupler 40 and hydraulic motor 34 in their connected positions in end-to-end alignment with generator 38. An opening would be created in one side of frame 6, to permit the end panel 18 of generator 38 to be exposed through frame 6 for easy operator access. Jack stands 20, and/or or other types of height adjustable feet, legs, or support members (not shown) would be attached under frame 6, with at least one jack stand 20, foot, leg, or other support member positioned under each lower corner of frame 6. For proper drive shaft 62 alignment with coupler 40 and hydraulic motor 34, an L-shaped bracket 56 or similar device would be used to support hydraulic motor 34 and raise it to the required height. Holes would be formed through the bottom of frame 6 for secure attachment of generator 38 and L-shaped bracket 56 to frame 6 with fasteners 54, such as heavy duty bolts. Support bars 60 could be secured to frame 6 to further help fix generator 38 and hydraulic motor 34 in place, and a vertically extending interior partition 64 could be temporarily or permanently installed within frame 6, to separate storage area 44 from the remaining interior space within the lower portion of frame 6 that houses generator 38, coupler 40, and hydraulic motor 34.

A cutout would be made in the upper back portion of frame 6 for the extension of both hydraulic hoses and couplers 12 beyond the perimeter of frame 6 for connection to the auxiliary hydraulic connections 32 of skid-steer loader 4, or another prime mover (not shown). Also, in the most preferred embodiments one or more doors 8 would be attached to the upper front portion of frame 6 with hinges 10, for easy access to the interior space within frame 6. Optionally, one or all of the doors 8 could be secured with a lock. If a grate (not shown) is placed in a substantially horizontally extending position within frame 6, between the upper and lower portions of frame 6, the interior space within the upper portion of frame 6 could then be made into a storage area 58 for housing tools, equipment, unused hoses, surplus extension cords, and the like. The back surface of the lower portion of frame 6 would be substantially planar, so that a mounting plate 42 could be attached to it that is configured for connection to the hydraulically operated front lifting arms of skid-steer loader 4 or another prime mover (not shown), so that the prime mover used is able to stabilize frame 6 during power generation use, and also lift frame 6 for its transport to other jobsite work areas. When hydraulic fluid flow control apparatus, such as flow control valve 14 and flow meter 16, are used in preferred embodiments of present invention 2, each would be connected to the outside surfaces of frame 6, for easy operator access. Provisions to protect flow control valve 14 and flow meter 16 would also be taken, such as placing them in a recessed area to protect them from inadvertent jobsite contact. It is also preferred for flow control valve 14, flow meter 16, and end panel 18 to be located near one another on frame 6 so as to all be visible at once to an operator with little change in his or her position.

Once generator 38, coupler 40, and hydraulic motor 34 are secured within frame 6, hydraulic hoses and couplers 12, as well as hoses 52 would be connected between hydraulic motor 34, flow control valve 14, and flow meter 16. Then the two hydraulic hoses and couplers 12 would be used to connect present invention 2 to the auxiliary hydraulic connections 32 on a nearby skid-steer loader 4, excavator, or other type of prime mover. When skid-steer loader 4 or the prime mover is subsequently started, and hydraulic fluid is permitted to flow through auxiliary hydraulic connections 32 and into the hydraulic hose and coupler 12 of present invention 2 used for fluid intake, flow control valve 14 can be adjusted to slowly increase inflow of hydraulic fluid toward hydraulic motor 34 so that repeated sudden changes in hydraulic pressure do not stress and cause premature wear on any components or fittings in present invention 2. When the flow of hydraulic fluid reaches the level needed to generate enough power to satisfactorily run all of the combinations of electric tools and pieces of power equipment needed in the work area around present invention 2, the electrical cords of a light tower 36 and/or several tools or pieces of power equipment can be concurrently plugged into the 110-volt plug-ins 28 or 220-volt plug-ins 66 in the end panel 18 of generator 38, and allowed to run as long as needed. Once use of the first powered tools and pieces of equipment is complete, and as their power cords are disconnected from end panel 18, the electrical cords of additional tools and pieces of power equipment can be plugged into end panel 18 as long as the amount of power generation provided does not become exceeded by demand. When work is completed at one jobsite location and there is a need to move frame 6 to a different work area, if present invention 2 is not already attached to skid-steer loader 4 or another prime mover on the jobsite, mounting plate 42 on the back of frame 6 would be engaged by the hydraulically-operated front lifting arms of skid-steer loader 4 or other prime mover, and used to raise the jack stands 20 connected to frame 6 off of the ground, and in such a manner transport frame 6 to the new work area. Once the front lifting arms of skid-steer loader 4 or the other prime mover lower the jack stands 20 connected to frame 6 to the ground at the new work area and particularly when the new work area has uneven terrain, the height of any jack stand 20 not firmly touching the ground would be lengthened until it is squarely supported by the ground. Mounting plate 42 could then be released from the lifting arms, however, should it be anticipated for frame 6 to again be moved to another work area, as well as for continued stabilization of frame 6, it is preferred for mounting plate 42 to be left attached to the lifting arms during power generation use. When work projects demand the use of more electrical tools or power equipment than can be connected into the 110-volt plug-ins 28 or 220-volt plug-ins 66 in end panel 18, it is contemplated that one or more pieces of power equipment, such as air compressor 48 or a water pump, to be hydraulically operated off of spinning couplet 40 through use of a pulley and belt 46. Further, a welder/type generator (not shown) could be installed in present invention 2 in place of generator 38, as could air compressor 48 or a pump, for hydraulic operation. Unused hoses, tools, equipment, extension cords, and other items found in and around frame 6, can be temporarily stored in upper storage area 58 or lower storage area 44. Bungee cords or other quickly deployed and easily releasable straps could be connected to the grate (not shown) separating the upper and lower portions of frame 6, and used to immobilize the stored hoses, tools, equipment, extension cords, and the like, during lifting and transport of frame 6 by skid-steer loader 4.

What is claimed is:

1. A power source attachment that runs off of the auxiliary hydraulics of prime movers, including skid-steer loaders and excavators, which is capable of operating lights, electrical tools, and power equipment at construction jobsites, small and difficult-to-reach work areas, and other work areas where municipally provided electrical power is inconveniently accessed or unavailable, and which also can provide residences and small businesses with power during emergencies, said attachment comprising:

a rigid frame having a substantially planar and vertically extending rear surface, said frame also defining a covered storage area configured for housing at least one piece of power equipment, a hydraulic motor, at least two hydraulic hoses, a plurality of hand-held electrical tools and accessories therefor, and electrical cords;

mounting plate means attached to said rear surface of said frame, said mounting plate means being adapted for elevation of said frame by a prime mover, movement of said frame by a prime mover from one location to another, and stabilization of said frame against a prime mover during hydraulic flow diversion therefrom when said frame is in a non-elevated position;

an hydraulic motor positioned within said frame;

two hydraulic hoses connected between said hydraulic motor and the auxiliary hydraulics of a prime mover, said hydraulic hoses being configured to temporarily divert hydraulic flow from the prime mover and through said hydraulic motor with one of said hydraulic hoses being an in-take hose and the other of said hydraulic hoses being a return hose;

a primary piece of power equipment having a drive shaft; and drive/coupler means connected between said primary piece of power equipment and said hydraulic motor, whereby said primary piece of power equipment is operated solely as a result of the hydraulic flow diverted from the prime mover through said hydraulic hoses and sufficient power is available to operate lights in combination with at least one hand-held electrical tool.

2. The attachment of claim 1 further comprising attachment means adapted for securing said hydraulic motor and said primary piece of power equipment in stationary positions within said frame while said frame is transported by a prime mover from one location to another on uneven terrain.

3. The attachment of claim 1 wherein said hydraulic motor has a drive shaft and wherein said drive/coupler means comprises a rotatable coupler operationally engaged with said drive shaft.

4. The attachment of claim 3 further comprising a drive belt and a secondary piece of power equipment having a drive shaft, wherein said secondary piece of power equipment is connected by said drive belt to said rotatable coupler for operation of said secondary piece of power equipment solely as a consequence of said coupler being rotated by the diverted hydraulic flow.

5. The attachment of claim 4 wherein said primary and secondary pieces of power equipment are selected from a group consisting of generators, pumps, and air compressors.

6. The attachment of claim 1 further comprising hydraulic flow control means.

7. The attachment of claim 6 wherein said hydraulic flow control means comprises an hydraulic flow control valve and an hydraulic flow control meter, and wherein said hydraulic flow control means and said hydraulic flow control valve are hydraulically connected between said in-take hose and said hydraulic motor.

8. The attachment of claim 1 further comprising additional frame components selected from a group consisting of adjustable ground support means being adapted for use on uneven terrain, partitions configured to create storage compartments within said frame, doors configured to provide easy access to said storage compartments, locked doors configured for limiting access to said storage compartments, mounting brackets, handles, and light towers.

9. The attachment of claim 8 wherein said adjustable ground support means comprises a plurality of adjustable jack stands.

10. The attachment of claim 1 further comprising safety bypass means configured to prevent excessive hydraulic pressure within said hydraulic motor.

11. A power source attachment for prime movers having auxiliary hydraulic systems, including skid steer loaders and excavators, which operates solely from the auxiliary hydraulics to provide power on jobsites, as well as in small and difficult-to-reach work areas, and other work areas where municipally provided electrical power is inconveniently accessed or unavailable, for the operation of lights, electrical tools, and power equipment, and which also can provide residences and small businesses with power during emergencies, said attachment comprising:

a rigid frame having a substantially planar and vertically extending rear surface and a mounting plate attached to said rear surface that is configured for engagement with a prime mover for support of said frame while said frame is lifted into an elevated position by the prime mover, as well as engagement with a prime mover for stabilization of said frame on uneven terrain, said frame also defining a covered storage area configured for housing at least one piece of power equipment, a hydraulic motor, and at least two hydraulic hoses;

an hydraulic motor secured within said frame and having a drive shaft;

a rotatable coupler operationally engaged with said drive shaft;

two hydraulic hoses connected between said hydraulic motor and the auxiliary hydraulics of a prime mover, said hydraulic hoses being configured to temporarily divert hydraulic flow from the prime mover and through said hydraulic motor with one of said hydraulic hoses being an in-take hose and the other of said hydraulic hoses being a return hose;

a primary piece of power equipment having a drive shaft; and drive means connected between said primary piece of power equipment and said coupler, said drive means being adapted for rotational engagement with said coupler whereby said primary piece of power equipment is operated solely as a result of the hydraulic flow diverted from the prime mover through said hydraulic hoses and sufficient power is available to operate lights in combination with at least one hand-held electrical tool.

12. The attachment of claim 11 further comprising a drive belt and a secondary piece of power equipment having a drive shaft, wherein said secondary piece of power equipment is connected by said drive belt to said rotatable coupler for operation of said secondary piece of power equipment solely as a consequence of said coupler being rotated by the diverted hydraulic flow.

13. The attachment of claim 12 wherein said primary and secondary pieces of power equipment are selected from a group consisting of generators, pumps, and air compressors.

14. The attachment of claim 11 further comprising safety bypass means configured to prevent excessive hydraulic pressure within said hydraulic motor and hydraulic flow control means.

15. The attachment of claim 11 further comprising additional frame components selected from a group consisting of adjustable ground support means adapted for use on uneven terrain, partitions configured to create storage compartments within said frame, doors configured to provide easy access to said storage compartments, locked doors configured for limiting access to said storage compartments, mounting brackets, handles, and light towers.

16. A method of making a power source attachment that runs off of the auxiliary hydraulics of prime movers, including skid-steer loaders and excavators, which is capable of operating lights, electrical tools, and power equipment at construction jobsites, small and difficult-to-reach work areas, and other work areas where municipally provided electrical power is inconveniently accessed or unavailable, and which also can provide residences and small businesses with power during emergencies, said method comprising the steps of:

providing a prime mover having an auxiliary hydraulic circuit, a rigid frame having a substantially planar and vertically extending rear surface and defining a covered storage area, a mounting plate configured for support of said frame when lifted by said prime mover a sufficient amount to raise said frame into an elevated position, an hydraulic motor with a drive shaft, two hydraulic hoses configured to temporarily divert hydraulic flow from said auxiliary hydraulic circuit of said prime mover, a primary piece of power equipment with a drive shaft, and at least one coupler;

attaching said mounting plate to said rear surface of said frame;

placing said hydraulic motor within said frame;

connecting said hydraulic hoses through said frame between said hydraulic motor and said auxiliary hydraulic circuit of said prime mover so that one of said hydraulic hoses becomes an in-take hose and the other of said hydraulic hoses becomes a return hose; and concurrently connecting at least one said coupler for rotation between said primary piece of power equipment and said drive shaft so that sufficient power is available to operate lights in combination with at least one hand-held electrical tool.

17. The method of claim 16 further comprising a step of providing additional frame components selected from a group consisting of adjustable ground support means being adapted for use on uneven terrain, partitions configured to create storage compartments within said frame, doors configured to provide easy access to said storage compartments, locked doors configured for limiting access to said storage compartments, mounting brackets, handles, and light towers.

18. The method of claim 16 further comprising the steps of providing a safety bypass configured to prevent excessive hydraulic pressure within said hydraulic motor, providing hydraulic flow control means, hydraulically connecting said safety bypass to said hydraulic motor, and hydraulically connecting said hydraulic flow control means between said in-take hose and said hydraulic motor.

19. The method of claim 16 further comprising the steps of providing a drive belt, providing a secondary piece of power equipment having a drive shaft, and connecting said drive belt between said secondary piece of power equipment and said coupler for operation of said secondary piece of power equipment solely as a consequence of said coupler being rotated by the hydraulic flow diverted via said hydraulic hoses from the prime mover.

20. The method of claim 19 wherein said steps of providing said primary and secondary pieces of power equipment are selected from a group consisting of generators, pumps, and air compressors.

* * * * *